(12) United States Patent
Li et al.

(10) Patent No.: US 11,119,349 B2
(45) Date of Patent: Sep. 14, 2021

(54) DISPLAY DEVICE

(71) Applicant: BOE TECHNOLOGY GROUP CO., LTD., Beijing (CN)

(72) Inventors: Zhongxiao Li, Beijing (CN); Xue Dong, Beijing (CN); Xiaochuan Chen, Beijing (CN); Wenqing Zhao, Beijing (CN); Haiyan Wang, Beijing (CN); Chen-Yu Chen, Beijing (CN); Xiaochen Niu, Beijing (CN); Jinye Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 765 days.

(21) Appl. No.: 15/774,959

(22) PCT Filed: Aug. 18, 2017

(86) PCT No.: PCT/CN2017/098044
§ 371 (c)(1),
(2) Date: May 9, 2018

(87) PCT Pub. No.: WO2018/133406
PCT Pub. Date: Jul. 26, 2018

(65) Prior Publication Data
US 2021/0165267 A1    Jun. 3, 2021

(30) Foreign Application Priority Data
Jan. 22, 2017 (CN) .......................... 201710046403.3

(51) Int. Cl.
*G02F 1/1335* (2006.01)
*G02F 1/1362* (2006.01)
(Continued)

(52) U.S. Cl.
CPC ...... *G02F 1/133504* (2013.01); *G02F 1/1323* (2013.01); *G02F 1/1334* (2013.01);
(Continued)

(58) Field of Classification Search
CPC ............. G02F 1/1323; G02F 1/133512; G02F 1/136209; G02F 2203/30; G02F 1/1347; G02F 1/13471; G02F 1/13476
See application file for complete search history.

(56) References Cited

U.S. PATENT DOCUMENTS

2014/0267965 A1   9/2014  Kanbayashi et al.
2015/0041833 A1*  2/2015  Nimura ............. H01L 29/78633
                                                      257/88
2019/0033632 A1*  1/2019  Lee ................... G02F 1/133602

FOREIGN PATENT DOCUMENTS

CN    105511179 A    4/2016
CN    105549266 A    5/2016
(Continued)

OTHER PUBLICATIONS

English Translation of International Search Report & Box V of Written Opinion, for PCT Patent Application No. PCT/CN2017/098044, dated Nov. 23, 2017, 23 pages.

*Primary Examiner* — Mariam Qureshi
(74) *Attorney, Agent, or Firm* — Kinney & Lange, P.A.

(57) ABSTRACT

Embodiments of the present disclosure provide a display device. The display device includes: a display panel including a plurality of sub-pixels, each of the sub-pixels including at least one display unit, each display unit including a first electrode, a second electrode and a liquid crystal layer, the liquid crystal layer being configured to deflect collimated light rays incident onto the display panel by controlling electric signals applied to the first electrode and the second electrode; and an optical member configured to convert
(Continued)

collimated light rays emitted from the liquid crystal layer into divergent light rays.

19 Claims, 9 Drawing Sheets

(51) Int. Cl.
  *G02F 1/1347* (2006.01)
  *G02F 1/13357* (2006.01)
  *G02F 1/13* (2006.01)
  *G02F 1/1343* (2006.01)
  *G02F 1/1334* (2006.01)

(52) U.S. Cl.
  CPC .... *G02F 1/13476* (2013.01); *G02F 1/133512* (2013.01); *G02F 1/133514* (2013.01); *G02F 1/133617* (2013.01); *G02F 1/134309* (2013.01); *G02F 1/136209* (2013.01); *G02F 2203/30* (2013.01)

(56) References Cited

FOREIGN PATENT DOCUMENTS

| | | |
|---|---|---|
| CN | 205281069 U | 6/2016 |
| CN | 106168719 A | 11/2016 |
| CN | 106526942 A | 3/2017 |
| CN | 106773218 A | 5/2017 |
| CN | 106802520 A | 6/2017 |

* cited by examiner

DISPLAY DEVICE

CROSS-REFERENCE TO RELATED APPLICATION

This application is a Section 371 National Stage Application of International Application No. PCT/CN2017/098044, filed on Aug. 18, 2017, entitled "Display Device", which has not yet published, which claims priority to Chinese Application No. 201710046403.3, filed on Jan. 22, 2017, incorporated herein by reference in their entirety.

BACKGROUND OF THE DISCLOSURE

Field of the Disclosure

The present disclosure relates to a field of display technology, in particular, to a display device.

Description of the Related Art

Currently, liquid crystal display is a display device that is widely used. The liquid crystal display has a series of advantages such as high color gamut, light weight, and fast response time, and has mature technologies in both theoretical research and practical processes. A display principle of the existing liquid crystal display is to realize grayscale display by using modulation of polarized light by liquid crystals. A polarizer is an essential element of the liquid crystal display. Polarizers need to be attached to both light incident side and light emitting side of one liquid crystal display panel, respectively.

SUMMARY

According to an aspect of the present disclosure, it is provided a display device including:

a display panel including a plurality of sub-pixels, each of the sub-pixels including at least one display unit, each display unit including a first electrode, a second electrode and a liquid crystal layer, the liquid crystal layer being configured to deflect collimated light rays incident onto the display panel by controlling electric signals applied to the first electrode and the second electrode; and an optical member configured to convert collimated light rays emitted from the liquid crystal layer into divergent light rays.

In an example, the liquid crystal layer is located between the first electrode and the second electrode, a first black matrix pattern is provided at a side of the first electrode facing away from the second electrode, a second black matrix pattern is provided at a side of the second electrode facing away from the first electrode, the second black matrix pattern has an opening, and an orthogonal projection of the opening of the second black matrix pattern on the first black matrix pattern at least partially coincides with the first black matrix pattern.

In an example, the optical member includes at least one of a haze film, a polymer dispersed liquid crystal structure and a quantum dot light emitting unit.

In an example, the haze film is at a side of the first black matrix pattern facing away from the liquid crystal layer.

In an example, the polymer dispersed liquid crystal structure includes:

a first substrate and a second substrate opposite to each other;

a fifth electrode at a side of the first substrate facing towards the second substrate;

a sixth electrode at a side of the second substrate facing towards the first substrate; and a polymer dispersed liquid crystal layer between the fifth electrode and the sixth electrode, wherein the polymer dispersed liquid crystal layer is in a haze state when an electric field is not generated between the fifth electrode and the sixth electrode.

In an example, the polymer dispersed liquid crystal layer is changed into a transparent state in response to an electric field generated between the fifth electrode and the sixth electrode.

In an example, the plurality of sub-pixels of the display panel includes a blue sub-pixel, a red sub-pixel, and a green sub-pixel, and wherein the quantum dot light emitting unit includes: a red quantum dot light emitting sub-unit in the display unit of the red sub-pixel; and a green quantum dot light emitting sub-unit in the display unit of the green sub-pixel.

In an example, the display panel further includes color filters, the color filters including a red filter in the display unit of the red sub-pixel and a green filter in the display unit of the green sub-pixel;

the liquid crystal layer includes a first region corresponding to the blue sub-pixel, a second region corresponding to the red sub-pixel, and a third region corresponding to the green sub-pixel; and the red quantum dot light emitting sub-unit is located between the second region and the red filter; and the green quantum dot light emitting sub-unit is located between the third region and the green filter.

In an example, the optical member further includes at least one of the haze film and the polymer dispersed liquid crystal structure in the display unit of the blue sub-pixel.

In an example, in the display unit of the red sub-pixel, the red quantum dot light emitting sub-unit is disposed at the same layer as the first black matrix pattern; and/or in the display unit of the green sub-pixel, the green quantum dot light emitting sub-unit is disposed at the same layer as the first black matrix pattern.

In an example, in the display unit of the blue sub-pixel, at least one of the haze film and the polymer dispersed liquid crystal structure is at a side of the first black matrix pattern facing away from the liquid crystal layer.

In an example, the haze film is disposed at the same layer as the first black matrix pattern.

In an example, the optical member further includes at least one of the haze film and the polymer dispersed liquid crystal structure in each of the display units of the red sub-pixel and the green sub-pixel, and the at least one of the haze film and the polymer dispersed liquid crystal structure is at a side of the first black matrix pattern facing away from the liquid crystal layer.

In an example, the color filters further includes a blue filter which is disposed at the same layer as the first black matrix pattern and corresponds to the blue sub-pixel.

In an example, the first electrode is a planar electrode, and the second electrode is a strip electrode.

Alternatively, the first electrode is a strip electrode and the second electrode is a strip electrode, and an extension direction of the first electrode is perpendicular to an extension direction of the second electrode.

In an example, the liquid crystal layer includes a first liquid crystal sub-layer and a second liquid crystal sub-layer; and wherein, the display unit further includes a third electrode and a fourth electrode between the first electrode and the second electrode, both the third electrode and the fourth electrode being planar electrodes; and wherein, the fourth electrode is located at a side of the third electrode facing away from the first electrode, the first liquid crystal sub-layer is disposed between the first electrode and the third electrode while the second liquid crystal sub-layer is disposed between the second electrode and the fourth electrode.

In an example, the display device further includes a backlight source at a light incident side of the display panel, wherein the backlight source emits blue light.

According to another aspect of the present disclosure, it is provided a display panel including a plurality of sub-pixels, each of the sub-pixels including at least one display unit, each display unit including a first electrode, a second electrode and a liquid crystal layer, wherein, the liquid crystal layer is located between the first electrode and the second electrode, a first black matrix pattern is provided at a side of the first electrode facing away from the second electrode, a second black matrix pattern is provided at a side of the second electrode facing away from the first electrode, the second black matrix pattern has an opening; and wherein, the liquid crystal layer is configured to deflect collimated light rays incident from the opening so that at least a part of deflected light rays bypass the first black matrix pattern and are emitted from the display panel in response to an electric field generated between the first electrode and the second electrode.

In an example, the first electrode is a planar electrode, and the second electrode is a strip electrode.

Alternatively, the first electrode is a strip electrode and the second electrode is a strip electrode, and an extension direction of the first electrode is perpendicular to an extension direction of the second electrode.

In an example, the liquid crystal layer includes a first liquid crystal sub-layer and a second liquid crystal sub-layer; and wherein, the display unit further includes a third electrode and a fourth electrode between the first electrode and the second electrode, both the third electrode and the fourth electrode being planar electrodes; and wherein, the fourth electrode is located at a side of the third electrode facing away from the first electrode, the first liquid crystal sub-layer is disposed between the first electrode and the third electrode while the second liquid crystal sub-layer is disposed between the second electrode and the fourth electrode.

DETAILED DESCRIPTION OF PREFERRED EMBODIMENTS OF THE DISCLOSURE

In order to make technical problems to be solved, technical solutions, and advantages in embodiments of the present disclosure more clear, specific embodiments with reference to accompanying drawings will be described in detail hereafter.

According to an exemplary embodiment of the present disclosure, a display device is provided. In the display device, a collimated backlight source is utilized to emit collimated light rays, and the liquid crystal modulates the collimated light rays by deflection so that the collimated light rays bypass a region shielded by black matrix (BM) to achieve light emitting.

Figure 1:
FIG. 1 is a schematic structural view of a display device according to an embodiment of the present disclosure.

As shown in FIG. 1, the display device may include a display panel 12 and a backlight source 13. The backlight source 13 is configured to emit collimated light rays which are incident onto the display panel 12.

Figure 2:
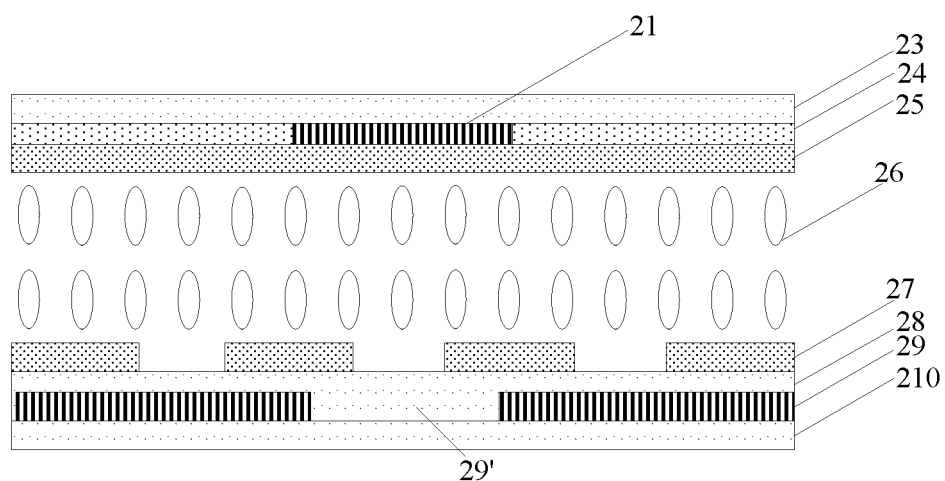
FIG. 2 is a schematic cross-sectional view of a display panel according to an embodiment of the present disclosure.

The display panel 12 includes a plurality of sub-pixels. Each of the sub-pixels includes at least one display unit. As shown in FIG. 2, each display unit includes a first electrode 25, a second electrode 27 and a liquid crystal layer 26 between the first electrode 25 and the second electrode 27. The liquid crystal layer 26 is configured to deflect the collimated light rays which are incident onto the display panel 12 by controlling electric signals applied to the first electrode 25 and the second electrode 27.

In the embodiment, by controlling the electrical signals applied to the first electrode and the second electrode, the liquid crystal layer may deflect the collimated light rays which are incident onto the display panel and adjust the ratio of light rays emitted from the display panel so as to achieve the grayscale display. With a technical solution of the present disclosure, the grayscale display may be achieved without any polarizer, resulting in a reduced cost of the display device and a reduced loss in light efficiency of the display device.

Referring to FIG. 2 further, the display unit includes a base substrate 23 and a base substrate 210. In each display unit, a first black matrix pattern 21 is provided at a side of the first electrode 25 facing away from the liquid crystal layer 26. A second black matrix pattern 29 is provided at a side of the second electrode 27 facing away from the liquid crystal layer 26. The second black matrix pattern 29 has an opening 29'. The first black matrix pattern 21 is arranged corresponding to the opening 29'. The first electrode 25 and the first black matrix pattern 21 are both provided on the base substrate 23, and the second electrode 27 and the second black matrix pattern 29 are both provided on the base substrate 210.

Figure 3:
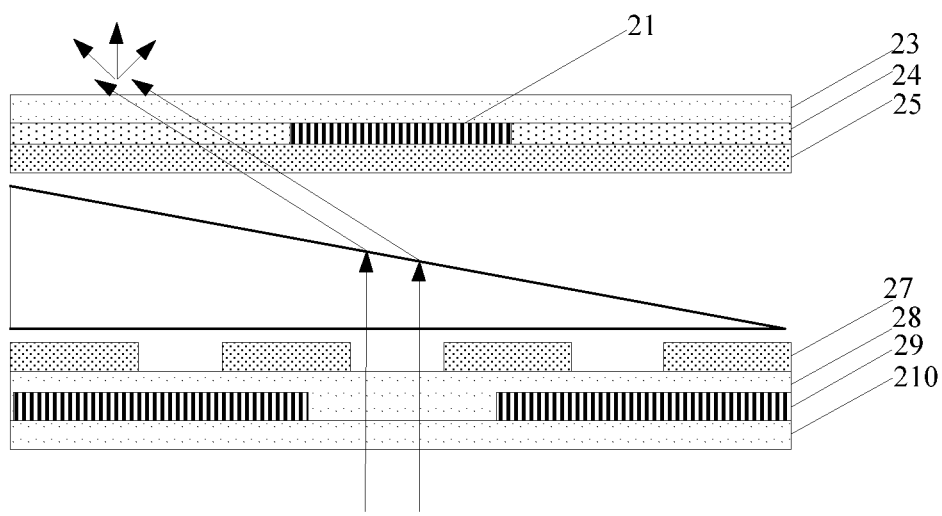
FIG. 3 is a schematic view of an optical path of the display panel in FIG. 2 in a bright state.
Figure 4:
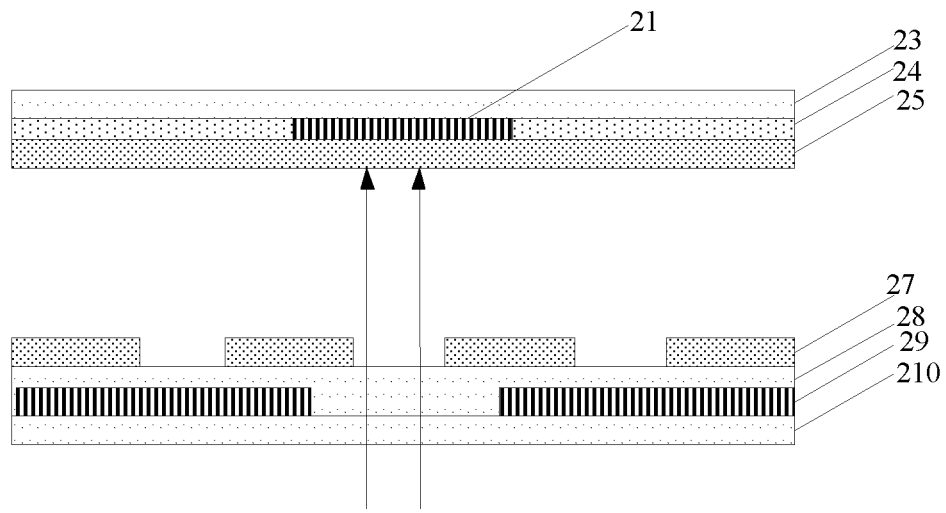
FIG. 4 is a schematic view of an optical path of the display panel in FIG. 2 in a dark state.

Referring to FIG. 3, when an electric field is generated between the first electrode 25 and the second electrode 27, the liquid crystal layer 26 between the first electrode 25 and the second electrode 27 is capable of deflecting collimated light rays (e.g. by refraction) which are incident from the opening 29' so that at least a part of deflected light rays bypass the first black matrix pattern 21 and are emitted from the display panel. Referring to FIG. 4, when an electric field is not generated between the first electrode 25 and the second electrode 27, the first black matrix pattern 21 is capable of completely shielding the collimated light rays which are incident from the opening 29'. In an alternative embodiment, when an electric field is not generated between the first electrode 25 and the second electrode 27, the liquid crystal layer 26 is capable of deflecting collimated light rays which are incident from the opening 29' so that at least a part of deflected light rays bypass the first black matrix pattern 21 and are emitted from the display panel. When an electric field is generated between the first electrode 25 and the second electrode 27, the first black matrix pattern 21 is capable of completely shielding the collimated light rays which are incident from the opening 29'.

An orthogonal projection of the opening 29' of the second black matrix pattern 29 on the base substrate 23 may at least partially coincide with an orthogonal projection of the first black matrix pattern 21 on the base substrate 23. In the illustrated embodiment, the orthogonal projection of the first black matrix pattern 21 on the base substrate 23 is greater than the orthogonal projection of the opening 29' of the second black matrix pattern 29 on the base substrate 23. Specifically, the orthogonal projection of the opening 29' of the second black matrix pattern 29 on the base substrate 23 completely falls into the first black matrix pattern 21. In this way, when the electric field is not generated between the first electrode 25 and the second electrode 27, it is ensured that the first black matrix pattern 21 completely shields the collimated light rays which are incident from the opening 29', so that no light leakage occurs. Obviously, this is merely an example for illustration, and those skilled in the art may set sizes of these orthogonal projections as needed.

In the embodiment, the collimated light rays enter the display panel through the opening 29' of the second black matrix pattern 29 and pass through the liquid crystal layer 26. Liquid crystal molecules in the liquid crystal layer 26 are deflected by an electric field between the first electrode 25 and the second electrode 27. By applying different electric signals to different electrodes, the electric field between the first electrode 25 and the second electrode 27 is adjusted so as to adjust deflection angles of liquid crystal molecules at different positions in the liquid crystal layer 26.

With reference to FIG. 2 and FIG. 3, the display panel includes a base substrate 23 (e.g., color film substrate), a base substrate 210 (e.g., array substrate), and a liquid crystal layer 26 between the base substrate 23 and the base substrate 210. The base substrate 23 is aligned with and assembled with the base substrate 210. A first black matrix pattern 21, color filters 24 and a first electrode 25 are disposed in sequence on a side of the base substrate 23 facing towards the base substrate 210. The color filters 24 and the first black matrix pattern 21 are disposed on the same layer, and the color filters 24 surround the first black matrix pattern 21 so that at least a part of light rays deflected by the liquid crystal layer 26 bypass the first black matrix pattern 21 and are emitted from the display panel through the color filters 24, thereby achieving a color display. Also, the color filters 24 and the first black matrix pattern 21 may function as a planarization layer to cover wirings formed on the base substrate 23. A second black matrix pattern 29, an insulation layer 28 and a second electrode 27 are disposed in sequence on a side of the base substrate 210 facing towards the base substrate 23. The insulation layer 28 may function as a planarization layer to cover a thin film transistor array and wirings formed on the base substrate 210. The second black matrix pattern 29 has an opening 29'. An orthogonal projection of the opening 29' on the first black matrix pattern 21 falls into the first black matrix pattern 21.

In an example, as shown in FIG. 3, the first electrode 25 is a planar electrode, and the second electrode 27 is a strip electrode. By applying different electric signals to different electrodes, the electric field may be adjusted so that the liquid crystal layer 26 functions as a right-angle prism, thereby changing an optical path of the collimated light rays. The incident collimated light rays are deflected so that at least a part of the light rays bypass the first black matrix pattern 21 and are emitted from the display panel. Since the deflected light rays are emitted from the display panel through the color filters, the color display may be realized.

As shown in FIG. 4, when an electric signal is not applied to the first electrode 25 and the second electrode 27 so that an electric field is not generated between the first electrode 25 and the second electrode 27, the collimated light rays entering through the opening of the second black matrix pattern 29 are not deflected and propagate along a straight line, so that the collimated light rays are shielded by the first black matrix pattern 21. In such a case, no light rays are emitted from the display panel, and the display panel displays a dark state.

By adjusting voltage values of the electric signals applied to the first electrode 25 and the second electrode 27, the liquid crystal layer 26 may deflect the incident collimated light rays at different angles, so that a part of the light rays are emitted from the display panel through the color filters while the other part of the light rays are absorbed by the first black matrix pattern 21. By adjusting the ratio of the part of the light rays to the other part of the light rays, the grayscale display may be realized.

Figure 5:
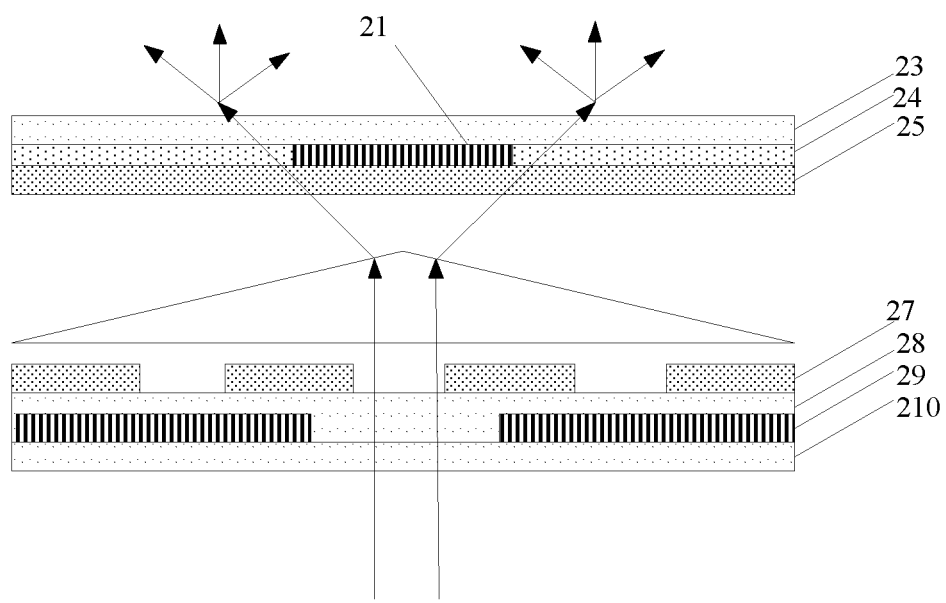
FIG. 5 is a schematic view of another optical path of the display panel in FIG. 2 in a bright state.

As shown in FIG. 5, by adjusting the voltage values of the electric signals applied to the first electrode 25 and the second electrode 27, the liquid crystal layer 26 may be equivalent to an isosceles triangle prism, so that the incident collimated rays are deflected in two directions and are emitted from the display panel from both sides of the first black matrix pattern 21. Therefore, the light rays emitted from the display panel are more uniform.

Moreover, by adjusting the voltage values of the electric signals applied to the first electrode 25 and the second electrode 27, the incident collimated rays are deflected in four directions and are emitted from the display panel from peripheral sides (e.g. four sides) of the first black matrix pattern 21. Therefore, the light rays emitted from the display panel are more uniform.

The sub-pixels of the display panel in this embodiment may include one or more display units, and the length of the display units is in a range of 10-20 μm. As a process capability is increased, the length of the display unit may be reduced to less than 10 μm.

In the illustrated structure, one electrode is a strip electrode while the other electrode is a planar electrode. In such a case, only light rays of a single polarization direction may be deflected. Alternatively, it is possible to design the first electrode 25 as a strip electrode and the second electrode 27 as a strip electrode, and an extending direction of the first electrode 25 is perpendicular to an extending direction of the second electrode 27. In this way, light rays of perpendicular polarization directions may also be deflected when only one liquid crystal cell is disposed between the first electrode 25 and the second electrode 27.

Figure 6:
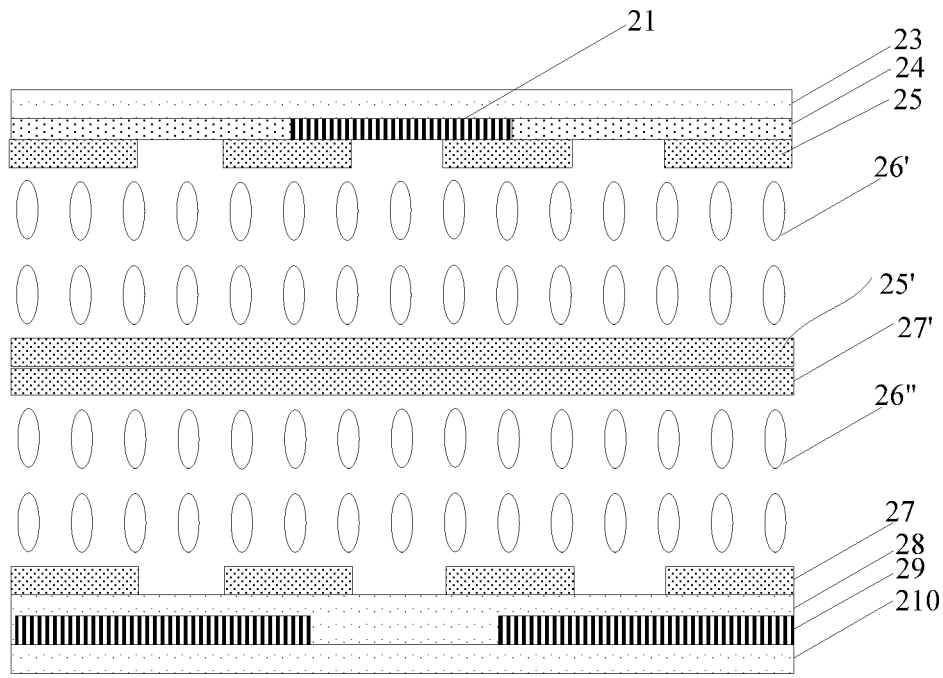
FIG. 6 is a schematic cross-sectional view of a display panel according to another embodiment of the present disclosure.

In an alternative embodiment, referring to FIG. 6, the display panel according to an embodiment of the present disclosure may be realized by using a dual liquid crystal cell structure. The liquid crystal layer 26 includes a first liquid crystal sub-layer 26' and a second liquid crystal sub-layer 26". The display unit may further include a third planar electrode 25' and a fourth planar electrode 27' between the first electrode 25 and the second electrode 27. The fourth planar electrode 27' is located at a side of the third planar electrode 25' facing away from the first electrode 25. The first liquid crystal sub-layer 26' is disposed between the first electrode 25 and the third planar electrode 25' while the second liquid crystal sub-layer 26" is disposed between the second electrode 27 and the fourth planar electrode 27'. When an electric signal is applied to the first electrode 25 and the third planar electrode 25', an electric field is generated between the first electrode 25 and the third planar electrode 25' so that the first liquid crystal sub-layer 26' may deflect collimated light rays of first polarization direction. When an electric signal is applied to the second electrode 27 and the fourth planar electrode 27', an electric field is generated between the second electrode 27 and the fourth planar electrode 27' so that the second liquid crystal sub-layer 26" may deflect collimated light rays of second polarization direction. The second polarization direction is perpendicular to the first polarization direction.

By applying electric signals to the first electrode 25 and the third planar electrode 25', liquid crystal molecules in the first liquid crystal sub-layer 26' are deflected under an action of electric field between the first electrode 25 and the third planar electrode 25', so that the first liquid crystal sub-layer 26' may deflect collimated light rays of first polarization direction. The second liquid crystal sub-layer 26" is located between the second electrode 27 and the fourth planar electrode 27'. By applying electric signals to the second electrode 27 and the fourth planar electrode 27', liquid crystal molecules in the second liquid crystal sub-layer 26" are deflected under an action of electric field between the second electrode 27 and the fourth planar electrode 27', so that the second liquid crystal sub-layer 26" may deflect collimated light rays of second polarization direction. The second polarization direction is perpendicular to the first polarization direction. In this way, the first liquid crystal sub-layer 26' and the second liquid crystal sub-layer 26" cooperate with each other to deflect light rays of different polarization directions.

In the above display device, the grayscale display may be achieved without any polarizer, resulting in a reduced cost of the display device and a reduced loss in light efficiency of the display device. However, the light rays emitted from the display device are still collimated light rays, causing a small viewing angle of the display device.

An embodiment of the present disclosure further includes a display device which is capable of increasing the viewing angle of the display device.

Figure 7:
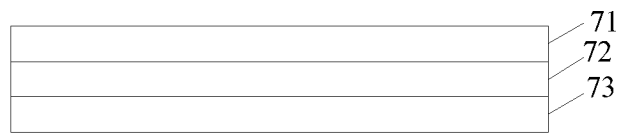
FIG. 7 is a schematic structural view of a display device according to another embodiment of the present disclosure.
Figure 8:
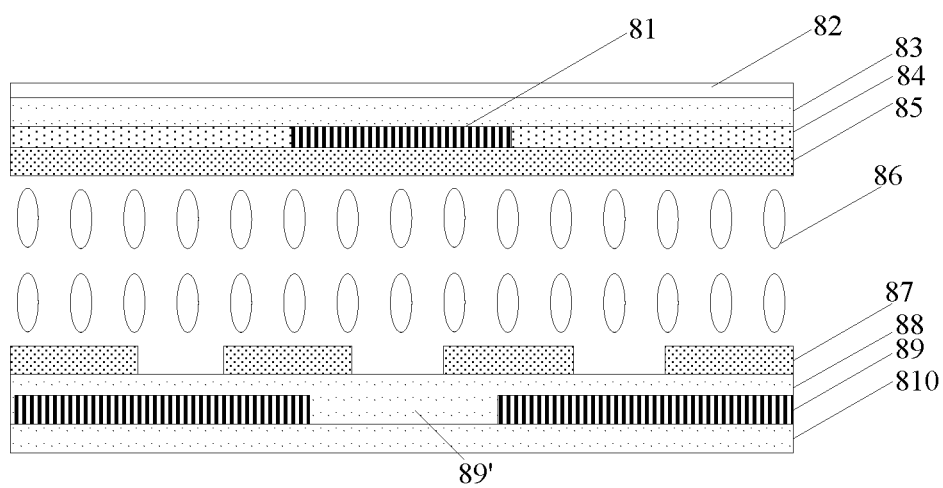
FIG. 8 is a schematic cross-sectional view of a display panel according to still another embodiment of the present disclosure, wherein an optical member is a haze film.
Figure 9:
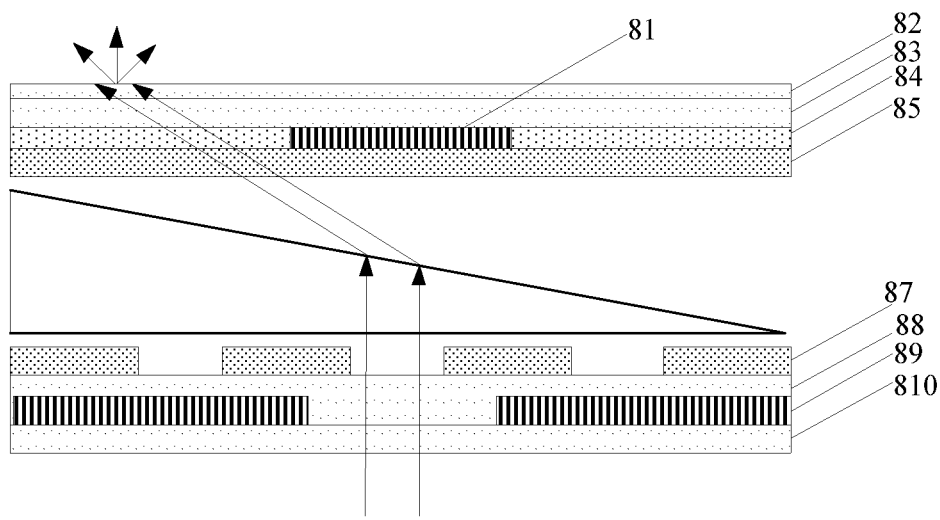
FIG. 9 is a schematic view of an optical path of the display panel in FIG. 8 in a bright state.
Figure 10:
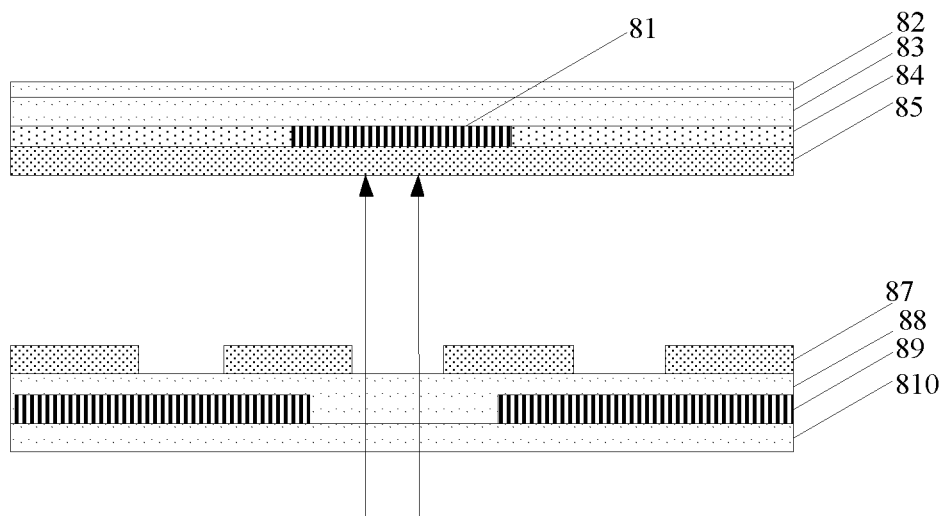
FIG. 10 is a schematic view of an optical path of the display panel in FIG. 8 in a dark state.
Figure 11:
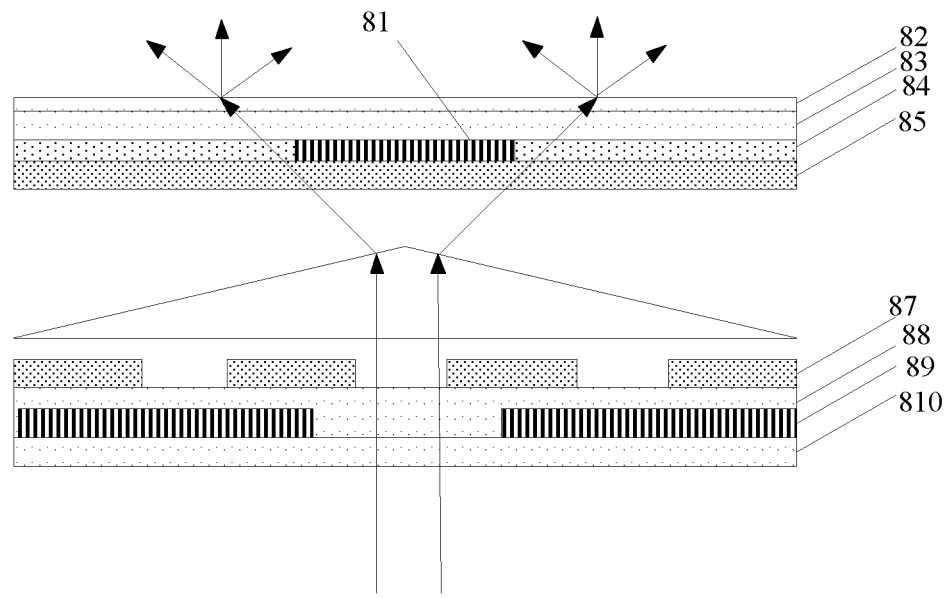
FIG. 11 is a schematic view of another optical path of the display panel in FIG. 8 in a bright state.

As shown in FIG. 7, the display device may include a display panel 72, an optical member 71 and a backlight source 73 at a light incident side of the display panel. The optical member 71 may be a separate component and positioned at a light emitting side of the display panel 72. Alternatively, the optical member 71 may be a part of the display panel 72. The backlight source 73 may be configured to provide collimated light rays which are incident onto the display panel 72.

Unless otherwise specified, the structures of the display panel 12 described in the above embodiments may be applied to the display panel 72 of the present embodiment.

In the embodiment of the present disclosure, the optical member 71 may include a haze film, a polymer dispersed liquid crystal structure, and/or a quantum dot light emitting unit. Of course, the optical member 71 is not limited to the haze film, the polymer dispersed liquid crystal structure and the quantum dot light emitting unit, it may also be other optical structures capable of diverging light.

Hereinafter, the display device according to the embodiment of the present disclosure will be described in detail by taking an example in which the optical member 71 may include a haze film, a polymer dispersed liquid crystal structure, and/or a quantum dot light emitting unit.

For example, the optical member 71 of the display device may be a haze film at a light emitting side of the display panel. The backlight source 73 of the display device may be a white backlight source.

As shown in FIG. 8-FIG. 11, the display panel includes a base substrate 83 (e.g., color film substrate), a base substrate 810 (e.g., array substrate), and a liquid crystal layer 86 between the base substrate 83 and the base substrate 810. The base substrate 83 is aligned with and assembled with the base substrate 810. A first black matrix pattern 81, color filters 84 and a first electrode 85 are disposed in sequence on a side of the base substrate 83 facing towards the base substrate 810. The color filters 84 and the first black matrix pattern 81 are disposed on the same layer, and the color filters 84 surround the first black matrix pattern 81 so that at least a part of light rays deflected by the liquid crystal layer 86 bypass the first black matrix pattern 81 and are emitted from the display panel through the color filters 84, thereby achieving a color display. Also, the color filters 84 and the first black matrix pattern 81 may function as a planarization layer to cover wirings formed on the base substrate 83. A second black matrix pattern 89, an insulation layer 88 and a second electrode 87 are disposed in sequence on a side of the base substrate 810 facing towards the base substrate 83. The insulation layer 88 may function as a planarization layer to cover a thin film transistor array and wirings formed on the base substrate 810. The second black matrix pattern 89 has an opening 89'. An orthogonal projection of the opening 89' on the first black matrix pattern 81 falls into the first black matrix pattern 81. A haze film 82 is located on a side of the base substrate 83 facing away from the first black matrix pattern 81. The haze film 82 may diverge emitted collimated light rays to increase the viewing angle of the display panel.

For example, the optical member 71 of the display device may be a polymer dispersed liquid crystal structure 126 at a light emitting side of the display panel. In the embodiment, the backlight source 73 of the display device may be a white backlight source.

Figure 12:
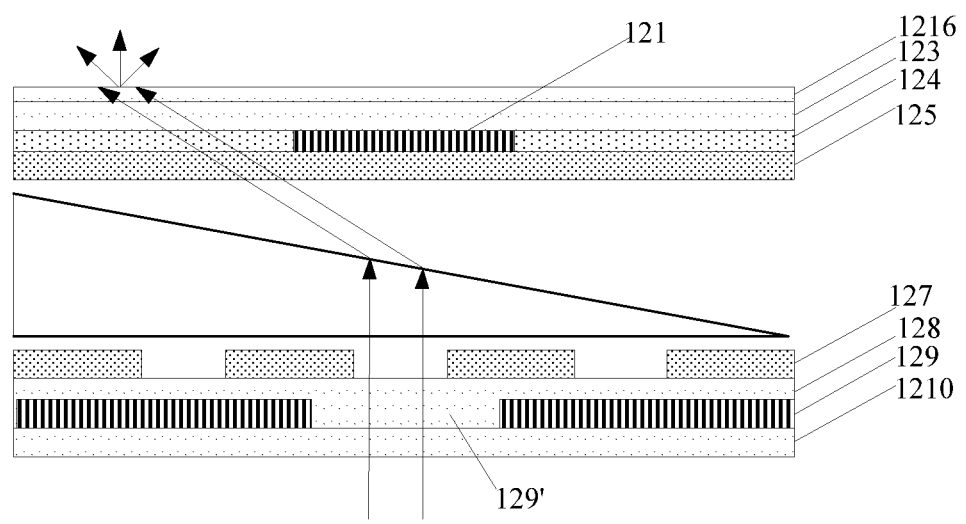
FIG. 12 is a schematic cross-sectional view of a display panel according to still another embodiment of the present disclosure, wherein an optical member is a polymer dispersed liquid crystal structure.

As shown in FIG. 12, the display panel in this embodiment includes a base substrate 123, a base substrate 1210, and a liquid crystal layer between the base substrate 123 and the base substrate 1210. The base substrate 123 is aligned with and assembled with the base substrate 1210. A first black matrix pattern 121, color filters 124 and a first electrode 125 are disposed in sequence on a side of the base substrate 123 facing towards the base substrate 1210. The color filters 124 and the first black matrix pattern 121 are disposed on the same layer, and the color filters 124 surround the first black matrix pattern 121 so that at least a part of light rays deflected by the liquid crystal layer bypass the first black matrix pattern 121 and are emitted from the display panel through the color filters 124, thereby achieving a color display. Also, the color filters 124 and the first black matrix pattern 121 may function as a planarization layer to cover wirings formed on the base substrate 123. A second black matrix pattern 129, an insulation layer 128 and a second electrode 127 are disposed in sequence on a side of the base substrate 1210 facing towards the base substrate 123. The insulation layer 128 may function as a planarization layer to cover a thin film transistor array and wirings formed on the base substrate 1210. The second black matrix pattern 129 has an opening 129'. An orthogonal projection of the opening 129' on the first black matrix pattern 121 falls into the first black matrix pattern 121. A polymer dispersed liquid crystal structure 1216 is located on a side of the base substrate 123 facing away from the first black matrix pattern 121. The polymer dispersed liquid crystal structure 1216 in an unpowered state may diverge emitted collimated light rays to increase the viewing angle of the display panel.

Figure 13:
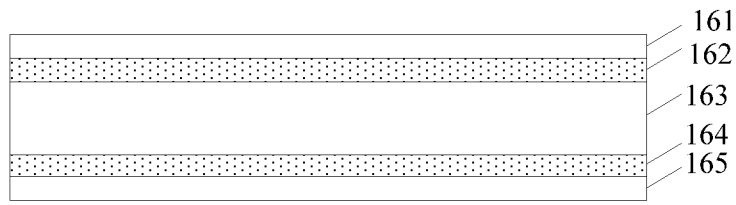
FIG. 13 is a schematic view of a polymer dispersed liquid crystal structure according to an embodiment of the present disclosure.

As shown in FIG. 13, the polymer dispersed liquid crystal structure 1216 may particularly include: a first substrate 161 and a second substrate 165 opposite to each other; a fifth electrode 162 at a side of the first substrate 161 facing towards the second substrate 165; a sixth electrode 164 at a side of the second substrate 165 facing towards the first substrate 161; and a polymer dispersed liquid crystal layer 163 between the fifth electrode 162 and the sixth electrode 164. For example, when an electric field is not generated between the fifth electrode 162 and the sixth electrode 164, the polymer dispersed liquid crystal layer 163 is in a haze state so that the incident collimated light rays may be diverged by the polymer dispersed liquid crystal layer 163 to form divergent light rays. For example, when an electric field is generated between the fifth electrode 162 and the sixth electrode 164, the polymer dispersed liquid crystal layer 163 is in a transparent state so that the incident collimated light rays may be emitted through the polymer dispersed liquid crystal layer 163.

In an example, the polymer dispersed liquid crystal structure 1216 may further include a driving unit for providing electric signals to the fifth electrode 162 and the sixth electrode 164.

In this way, when it is required to achieve privacy display in a certain range, electric signals may be applied to the fifth electrode 162 and the sixth electrode 164, and an electric field is generated between the fifth electrode 162 and the sixth electrode 164. The polymer dispersed liquid crystal layer 163 is in the transparent state, so that the incident collimated light rays are directly emitted, and the viewing angle of the display panel is relatively small. When the viewing angle of the display panel needs to be enlarged, electric signals are no longer applied to the fifth electrode 162 and the sixth electrode 164, and no electric field is generated between the electrode 162 and the sixth electrode 164. The polymer dispersed liquid crystal layer 163 is in a haze state and may diverge the incident collimated light rays into divergent rays. After an actual testing, the polymer dispersed liquid crystal layer 163 may diverge light rays with an exit angle of plus or minus 30° into light rays with an exit angle of more than plus or minus 55°, thereby greatly increasing the viewing angle of the display panel.

For example, the optical member 71 may include a quantum dot light emitting unit. The backlight source 73 of the display device is a blue backlight source. A spectrum of the blue backlight source is narrow and a wavelength thereof is relatively uniform. The liquid crystal layer may control the deflection of light rays more precisely.

The display panel in the embodiment may include a blue sub-pixel, a red sub-pixel, and a green sub-pixel. The liquid crystal layer includes a first region corresponding to the blue sub-pixel, a second region corresponding to the red sub-pixel, and a third region corresponding to the green sub-pixel. The color filters include a red filter corresponding to the red sub-pixel and a green filter corresponding to the green sub-pixel. As the backlight source is a blue backlight source, a blue filter corresponding to the blue sub-pixel may not be provided. Alternatively, a blue filter corresponding to the blue sub-pixel may also be provided.

Figure 14:
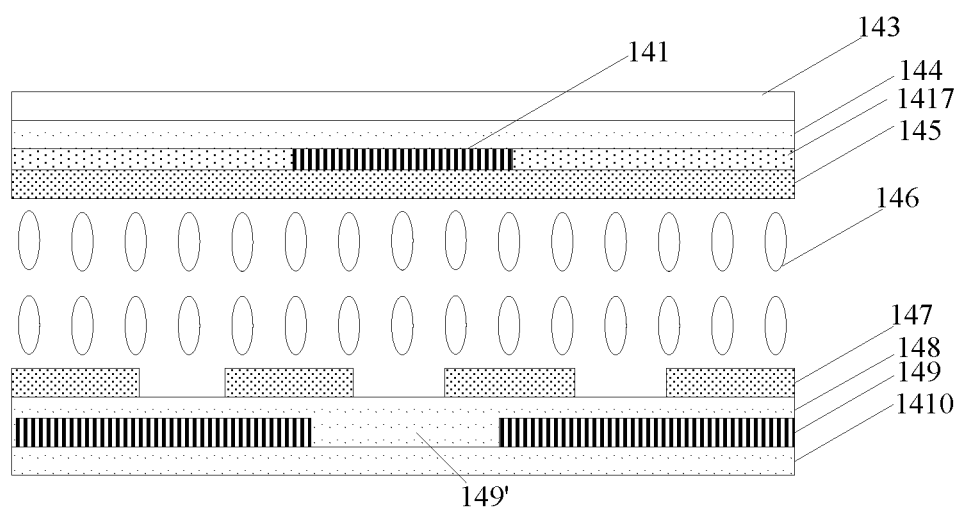
FIG. 14 is a schematic cross-sectional view of a red sub-pixel or a green sub-pixel of a display panel according to still another embodiment of the present disclosure, wherein an optical member is a quantum dot light emitting unit.

As shown in FIG. 14, in portions corresponding to the red sub-pixel and the green sub-pixel, the display panel includes a base substrate 143, a base substrate 1410, and a liquid crystal layer 146 between the base substrate 143 and the base substrate 1410. The base substrate 143 is aligned with and assembled with the base substrate 1410. A first black matrix pattern 141, color filters 144 and a first electrode 145 are disposed in sequence on a side of the base substrate 143 facing towards the base substrate 1410. A second black matrix pattern 149, an insulation layer 148 and a second electrode 147 are disposed in sequence on a side of the base substrate 1410 facing towards the base substrate 143. The insulation layer 148 may function as a planarization layer to cover a thin film transistor array and wirings formed on the base substrate 1410. The second black matrix pattern 149 has an opening 149'. An orthogonal projection of the opening 149' on the first black matrix pattern 141 falls into the first black matrix pattern 141. A quantum dot light emitting unit 1417 is disposed on a side of the base substrate 143 on which the first black matrix pattern 141 is disposed. In the portion corresponding to the red sub-pixel, the quantum dot light emitting unit 1417 is a red quantum dot light emitting unit (also called red quantum dot light emitting sub-unit) and may emit red light under an excitation of blue light. In the portion corresponding to the green sub-pixel, the quantum dot light emitting unit 1417 is a green quantum dot light emitting unit (also called green quantum dot light emitting sub-unit) and may emit green light under an excitation of blue light.

The quantum dot light emitting unit 1417 and the first black matrix pattern 141 are disposed on the same layer, and the quantum dot light emitting unit 1417 surrounds the first black matrix pattern 141 so that at least a part of light rays deflected by the liquid crystal layer 146 bypass the first black matrix pattern 141 and are emitted from the display panel through the quantum dot light emitting unit 1417 to emit light rays of corresponding color, thereby achieving a color display. Also, the collimated light rays are converted into divergent light rays at a divergent angle through the quantum dot light emitting unit 1417, so that the viewing angle of the display panel is increased.

Since a part of blue light rays may pass through the quantum dot light emitting unit 1417, color filters 144 need to be disposed to filter light rays so that light rays through the color filters are red light rays or green light rays. By using the quantum dot light emitting unit 1417 to diverge the light rays, a light emission efficiency may be increased and the light emission efficiency may reach up to 90% or more than 90%.

Since the quantum dot light emitting unit 1417 is not disposed in the display unit of the blue sub-pixel, the haze film or the polymer dispersed liquid crystal structure may be utilized to diverge the light rays emitted from the blue sub-pixel.

Figure 15:
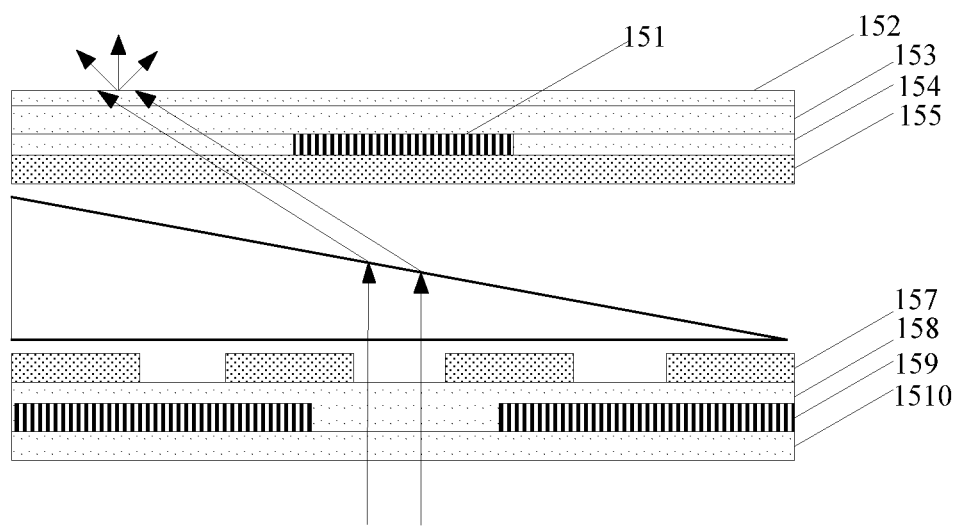
FIG. 15 is a schematic cross-sectional view of a blue sub-pixel of a display panel according to still another embodiment of the present disclosure, wherein an optical member is a haze film.

As shown in FIG. 15, in the portion corresponding to the blue sub-pixel, the haze film 152 is utilized to diverge the light rays emitted from the blue sub-pixel. The display panel includes a base substrate 153, a base substrate 1510, and a liquid crystal layer between the base substrate 153 and the base substrate 1510. The base substrate 153 is aligned with and assembled with the base substrate 1510. A first black matrix pattern 151 and a first electrode 155 are disposed in sequence on a side of the base substrate 153 facing towards the base substrate 1510. A second black matrix pattern 159, an insulation layer 158 and a second electrode 157 are disposed in sequence on a side of the base substrate 1510 facing towards the base substrate 153. The insulation layer 158 may function as a planarization layer to cover a thin film transistor array and wirings formed on the base substrate 1510. The second black matrix pattern 159 has an opening 159'. An orthogonal projection of the opening 159' on the first black matrix pattern 151 falls into the first black matrix pattern 151. A haze film 152 is provided on a side of the base substrate 153 facing away from the first black matrix pattern 151. In this way, at least a part of blue light rays deflected by the liquid crystal layer bypass the first black matrix pattern 151, are emitted from the display panel through the haze film 152, and are diverged into light rays at a divergent angle, thereby increasing the viewing angle of the display panel.

In an exemplary embodiment, a blue filter 154 may be further disposed on the base substrate 153. The blue filter 154 may be disposed in the same layer as the first black matrix pattern 151 and surrounds the first black matrix pattern 151. At least a part of blue light rays deflected by the liquid crystal layer bypass the first black matrix pattern 151, are emitted from the display panel through the blue filter 154 and the haze film 152, and become divergent light rays of divergent angles, thereby increasing the viewing angle of the display panel.

Figure 18:
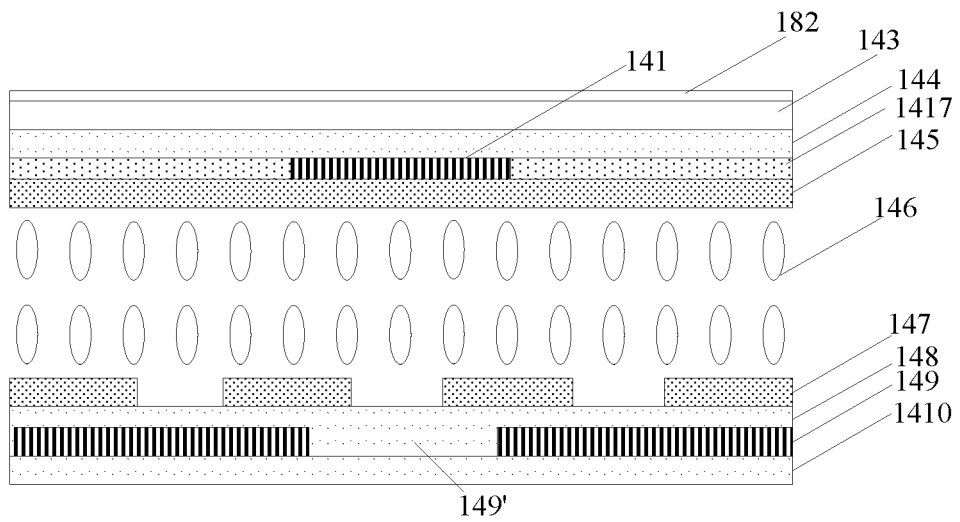
FIG. 18 is a schematic cross-sectional view of a red sub-pixel or a green sub-pixel of a display panel according to still another embodiment of the present disclosure, wherein an optical member includes a quantum dot light emitting unit and a haze film.

In the embodiment shown in FIG. 15, the haze film 152 is typically formed on the entire base substrate 153. In this way, the structures of the corresponding parts of the red sub-pixel and the green sub-pixel may be shown in FIG. 18. A haze film 182 is provided at a side of the base substrate 143 facing away from the first black matrix pattern 141. The haze film 182 and the quantum dot light emitting unit 1417 cooperate to increase further the viewing angle of the display device.

Figure 17:
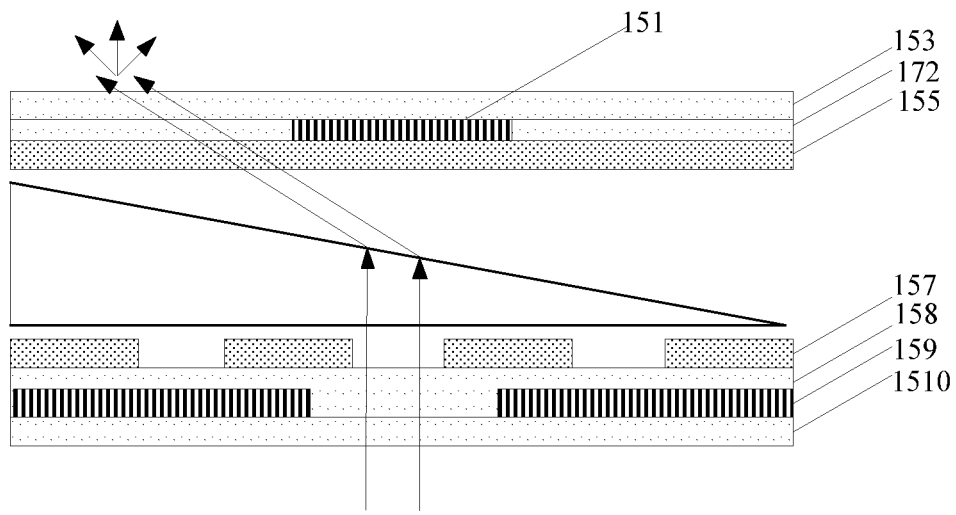
FIG. 17 is a schematic cross-sectional view of a blue sub-pixel of a display panel according to still another embodiment of the present disclosure, wherein an optical member is a haze film disposed at the same layer as a black matrix.

In an alternative embodiment, a filter may not be provided in the display unit of the blue sub-pixel. For example, referring to FIG. 17, the haze film 172 may be disposed in the same layer as the first black matrix pattern 151 and surround the first black matrix pattern 151. At least a part of blue light rays deflected by the liquid crystal layer bypass the first black matrix pattern 151, are emitted from the display panel through the haze film 172, and become divergent light rays of divergent angles, thereby increasing the viewing angle of the display panel.

Figure 16:
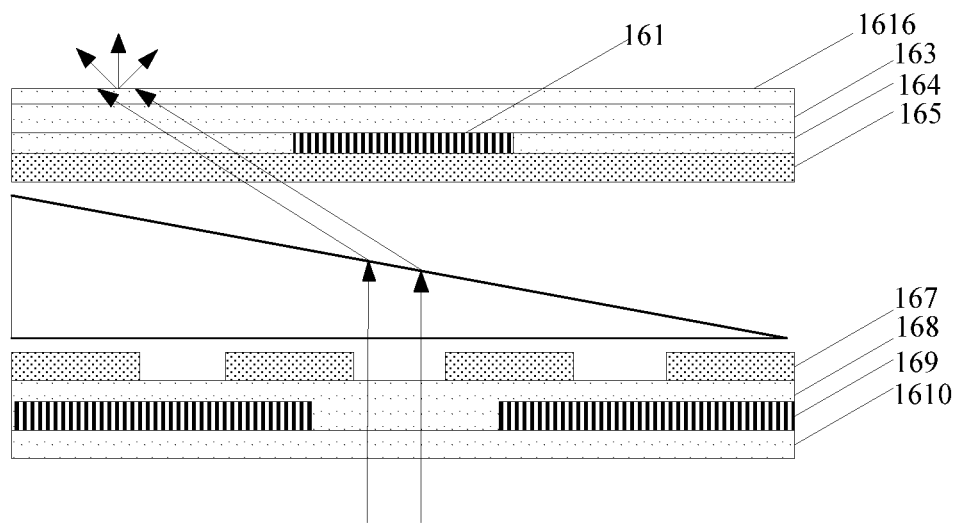
FIG. 16 is a schematic cross-sectional view of a blue sub-pixel of a display panel according to still another embodiment of the present disclosure, wherein an optical member is a polymer dispersed liquid crystal structure.

In another exemplary embodiment, in the portion corresponding to the blue sub-pixel, the polymer dispersed liquid crystal structure 1616 is utilized to diverge the light rays emitted from the blue sub-pixel. As shown in FIG. 16, the display panel includes a base substrate 163, a base substrate 1610, and a liquid crystal layer between the base substrate 163 and the base substrate 1610. The base substrate 163 is aligned with and assembled with the base substrate 1610. A first black matrix pattern 161 and a first electrode 165 are disposed in sequence on a side of the base substrate 163 facing towards the base substrate 1610. A second black matrix pattern 169, an insulation layer 168 and a second electrode 167 are disposed in sequence on a side of the base substrate 1610 facing towards the base substrate 163. The insulation layer 168 may function as a planarization layer to cover a thin film transistor array and wirings formed on the base substrate 1610. The second black matrix pattern 169 has an opening. An orthogonal projection of the opening on the first black matrix pattern 161 falls into the first black matrix pattern 161. The polymer dispersed liquid crystal structure 1616 is provided on a side of the base substrate 163 facing away from the first black matrix pattern 161. In this way, in a state that the polymer dispersed liquid crystal structure 1616 is not powered, at least a part of blue light rays deflected by the liquid crystal layer bypass the first black matrix pattern 161, are emitted from the display panel through the polymer dispersed liquid crystal structure 1616, and are diverged into light rays at a divergent angle, thereby increasing the viewing angle of the display panel.

In an exemplary embodiment, a filter may not be provided in the display unit of the blue sub-pixel. At least a part of blue light rays deflected by the liquid crystal layer bypass the first black matrix pattern 161, are emitted from the display panel through the polymer dispersed liquid crystal structure 1616, and become divergent light rays of divergent angles, thereby increasing the viewing angle of the display panel. In an alternative embodiment, a blue filter 164 may be further disposed on the base substrate 163. The blue filter 164 may be disposed in the same layer as the first black matrix pattern 161 and surrounds the first black matrix pattern 161. At least a part of blue light rays deflected by the liquid crystal layer bypass the first black matrix pattern 161, are emitted from the display panel through the blue filter 164 and the polymer dispersed liquid crystal structure 1616, and become divergent light rays of divergent angles, thereby increasing the viewing angle of the display panel.

Figure 19:
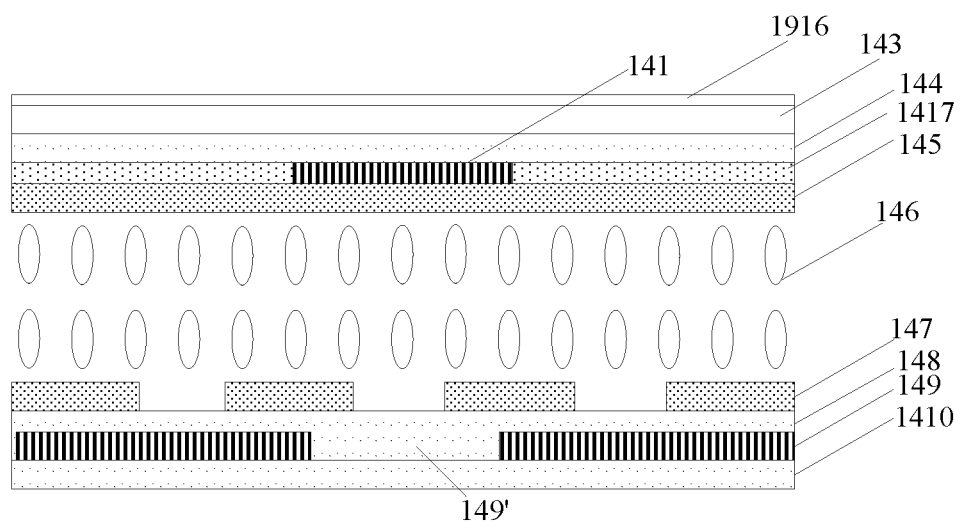
FIG. 19 is a schematic cross-sectional view of a red sub-pixel or a green sub-pixel of a display panel according to still another embodiment of the present disclosure, wherein an optical member includes a quantum dot light emitting unit and a polymer dispersed liquid crystal structure.

The polymer dispersed liquid crystal structure 1616 is utilized to diverge the light rays emitted from the blue sub-pixel in the display unit of the blue sub-pixel. In such a case, it is required to form the polymer dispersed liquid crystal structure 1616 across the entire base substrate 163. In such a case, the portions corresponding to the red sub-pixel and the green sub-pixel may be illustrated in FIG. 19. The polymer dispersed liquid crystal structure 1916 is disposed on a side of the base substrate 143 facing away from the first black matrix pattern 141. The polymer dispersed liquid crystal structure 1916 cooperates with the quantum dot light emitting unit 1417 to better increase the viewing angle of the display device.

In the above embodiments, by controlling the electric signals applied to the first electrode and the second electrode, the liquid crystal layer may deflect the incident collimated light rays and adjust the ratio of light rays emitted from the display panel to achieve grayscale display. The grayscale display may be achieved without any polarizer, resulting in a reduced cost of the display device and a reduced loss in light efficiency of the display device. The light rays emitted from the liquid crystal layer may be collimated light rays. The collimated light rays emitted from the liquid crystal layer are converted into divergent light rays by the optical member in order to increase the viewing angle of the display device. Thus, the viewing angle of the display device may be increased.

The above description shows some exemplary embodiments of the present disclosure. It should be pointed out that those skilled in the art may make several improvements and modifications without departing from the principle of the present disclosure. These improvements and modifications should also be regarded as the scope of the present disclosure.

What is claimed is:

1. A display device comprising:
a display panel comprising a plurality of sub-pixels, each of the sub-pixels comprising at least one display unit, each display unit comprising a first electrode, a second electrode and a liquid crystal layer, the liquid crystal layer being configured to deflect collimated light rays incident onto the display panel by controlling electric signals applied to the first electrode and the second electrode; and
an optical member configured to convert collimated light rays emitted from the liquid crystal layer into divergent light rays,
wherein the liquid crystal layer is located between the first electrode and the second electrode, a first black matrix pattern is provided at a side of the first electrode facing away from the second electrode, a second black matrix pattern is provided at a side of the second electrode facing away from the first electrode, the second black matrix pattern has an opening, the first black matrix pattern is arranged corresponding to the opening, and an orthogonal projection of the opening of the second black matrix pattern on the first black matrix pattern at least partially coincides with the first black matrix pattern.

2. The display device of claim 1, wherein, the optical member comprises at least one of a haze film, a polymer dispersed liquid crystal structure and a quantum dot light emitting unit.

3. The display device of claim 2, wherein, the haze film is at a side of the first black matrix pattern facing away from the liquid crystal layer.

4. The display device of claim 2, wherein the optical member comprises the polymer dispersed liquid crystal structure, the polymer dispersed liquid crystal structure comprising:

a first substrate and a second substrate opposite to each other;
a fifth electrode at a side of the first substrate facing towards the second substrate;
a sixth electrode at a side of the second substrate facing towards the first substrate; and
a polymer dispersed liquid crystal layer between the fifth electrode and the sixth electrode,
wherein, the polymer dispersed liquid crystal layer is in a haze state when an electric field is not generated between the fifth electrode and the sixth electrode.

5. The display device of claim 4, wherein, the polymer dispersed liquid crystal layer is changed into a transparent state in response to an electric field generated between the fifth electrode and the sixth electrode.

6. The display device of claim 2, wherein the optical member comprises the quantum dot light emitting unit, the plurality of sub-pixels of the display panel comprises a blue sub-pixel, a red sub-pixel, and a green sub-pixel, and wherein, the quantum dot light emitting unit comprises: a red quantum dot light emitting sub-unit in the display unit of the red sub-pixel; and a green quantum dot light emitting sub-unit in the display unit of the green sub-pixel.

7. The display device of claim 6, wherein:
the display panel further comprises color filters, the color filters comprising a red filter in the display unit of the red sub-pixel and a green filter in the display unit of the green sub-pixel;
the liquid crystal layer comprises a first region corresponding to the blue sub-pixel, a second region corresponding to the red sub-pixel, and a third region corresponding to the green sub-pixel; and
the red quantum dot light emitting sub-unit is located between the second region and the red filter; and the green quantum dot light emitting sub-unit is located between the third region and the green filter.

8. The display device of claim 7, wherein:
in the display unit of the red sub-pixel, the red quantum dot light emitting sub-unit is disposed at the same layer as the first black matrix pattern; and/or
in the display unit of the green sub-pixel, the green quantum dot light emitting sub-unit is disposed at the same layer as the first black matrix pattern.

9. The display device of claim 8, wherein, the optical member further comprises at least one of the haze film and the polymer dispersed liquid crystal structure in each of the display units of the red sub-pixel and the green sub-pixel, and the at least one of the haze film and the polymer dispersed liquid crystal structure is at a side of the first black matrix pattern facing away from the liquid crystal layer.

10. The display device of claim 6, wherein, the optical member further comprises at least one of the haze film and the polymer dispersed liquid crystal structure in the display unit of the blue sub-pixel.

11. The display device of claim 10, wherein, in the display unit of the blue sub-pixel, at least one of the haze film and the polymer dispersed liquid crystal structure is at a side of the first black matrix pattern facing away from the liquid crystal layer.

12. The display device of claim 11, wherein, the color filters further comprises a blue filter which is disposed at the same layer as the first black matrix pattern and corresponds to the blue sub-pixel.

13. The display device of claim 10, wherein, the haze film is disposed at the same layer as the first black matrix pattern.

14. The display device of claim 6, further comprising a backlight source at a light incident side of the display panel, wherein the backlight source emits blue light.

15. The display device of claim 1, wherein:
the first electrode is a planar electrode, and the second electrode is a strip electrode; or
the first electrode is a strip electrode and the second electrode is a strip electrode, and an extension direction of the first electrode is perpendicular to an extension direction of the second electrode.

16. The display device of claim 1, wherein, the liquid crystal layer comprises a first liquid crystal sub-layer and a second liquid crystal sub-layer; and
wherein, the display unit further comprises a third electrode and a fourth electrode between the first electrode and the second electrode, both the third electrode and the fourth electrode being planar electrodes; and
wherein, the fourth electrode is located at a side of the third electrode facing away from the first electrode, and the first liquid crystal sub-layer is disposed between the first electrode and the third electrode while the second liquid crystal sub-layer is disposed between the second electrode and the fourth electrode.

17. A display panel comprising a plurality of sub-pixels, each of the sub-pixels comprising at least one display unit, each display unit comprising a first electrode, a second electrode and a liquid crystal layer,
wherein, the liquid crystal layer is located between the first electrode and the second electrode, a first black matrix pattern is provided at a side of the first electrode facing away from the second electrode, a second black matrix pattern is provided at a side of the second electrode facing away from the first electrode, the second black matrix pattern has an opening, and an orthogonal projection of the opening of the second black matrix pattern on the first black matrix pattern at least partially coincides with the first black matrix pattern; and
wherein, the liquid crystal layer is configured to deflect collimated light rays incident from the opening so that at least a part of deflected light rays bypass the first black matrix pattern and are emitted from the display panel in response to an electric field generated between the first electrode and the second electrode.

18. The display panel of claim 17, wherein:
the first electrode is a planar electrode, and the second electrode is a strip electrode; or
the first electrode is a strip electrode and the second electrode is a strip electrode, and an extension direction of the first electrode is perpendicular to an extension direction of the second electrode.

19. The display panel of claim 17, wherein, the liquid crystal layer comprises a first liquid crystal sub-layer and a second liquid crystal sub-layer; and
wherein, the display unit further comprises a third electrode and a fourth electrode between the first electrode and the second electrode, both the third electrode and the fourth electrode being planar electrodes; and
wherein, the fourth electrode is located at a side of the third electrode facing away from the first electrode, the first liquid crystal sub-layer is disposed between the first electrode and the third electrode while the second liquid crystal sub-layer is disposed between the second electrode and the fourth electrode.

* * * * *